US006171096B1

(12) United States Patent
Hood

(10) Patent No.: US 6,171,096 B1
(45) Date of Patent: Jan. 9, 2001

(54) DIE FOR MAKING EXTRUDED PENCIL BLANK

(75) Inventor: Laurence R. Hood, Moraga, CA (US)

(73) Assignee: California Cedar Products Company, Stockton, CA (US)

( * ) Notice: Under 35 U.S.C. 154(b), the term of this patent shall be extended for 0 days.

(21) Appl. No.: 09/386,324

(22) Filed: Aug. 30, 1999

Related U.S. Application Data

(62) Division of application No. 09/023,818, filed on Feb. 13, 1998.

(51) Int. Cl.$^{7}$ .......................... B29C 47/14; B29C 47/12; B29C 37/00

(52) U.S. Cl. .......................................... 425/461; 264/160

(58) Field of Search .................................. 264/160, 157, 264/148; 425/461; 428/167, 55, 56, 50; 401/49

(56) References Cited

U.S. PATENT DOCUMENTS

| | | | | |
|---|---|---|---|---|
| 129,096 | * | 7/1872 | Brown | 264/160 |
| 1,937,104 | | 11/1933 | Thomsen | 18/55 |
| 2,976,164 | | 3/1961 | Glab | 106/163 |
| 2,988,784 | | 6/1961 | Lorenian | 18/59 |
| 3,033,695 | | 5/1962 | Glab | 106/163 |
| 3,704,071 | | 11/1972 | Muller et al. | 401/96 |
| 3,843,745 | | 10/1974 | Talbott et al. | 264/24 |
| 3,875,088 | | 4/1975 | Arons et al. | 260/2.5 |
| 3,908,902 | | 9/1975 | Collins et al. | 238/83 |
| 3,993,408 | | 11/1976 | Arons et al. | 401/96 |
| 4,176,978 | | 12/1979 | Ruzicka et al. | 401/96 |
| 4,904,434 | * | 2/1990 | Hyer | 264/146 |
| 5,002,713 | | 3/1991 | Palardy et al. | 264/109 |
| 5,082,605 | | 1/1992 | Brooks et al. | 264/40.6 |
| 5,088,910 | | 2/1992 | Goforth et al. | 425/142 |
| 5,096,406 | * | 3/1992 | Brooks et al. | 425/205 |
| 5,151,238 | | 9/1992 | Earl et al. | 264/136 |
| 5,346,930 | | 9/1994 | Maine et al. | 523/164 |
| 5,516,472 | * | 5/1996 | Laver | 264/118 |

FOREIGN PATENT DOCUMENTS

| | | |
|---|---|---|
| 1 024 486 | 4/1953 | (FR) . |
| 1 034 095 | 7/1953 | (FR) . |

OTHER PUBLICATIONS

"How a Cedar Pencil is Made", 1 page. Pre–1998.
"Lydall Pencil Board: Pencil Slat Material Made with 100% Recycled Fibers", 10 pages, 1996.

* cited by examiner

*Primary Examiner*—Ellis Robinson
*Assistant Examiner*—Laura L. Lee
(74) *Attorney, Agent, or Firm*—Skjerven Morrill MacPherson LLP; David E. Steuber

(57) ABSTRACT

A generally flat rectangular pencil blank made from a composite celluosic and resin material or cross-linking agent includes a longitudinal axis, a first surface and a second surface with a repeatable profile transverse to the longitudinal axis on the first surface of the blank, the profile representing an approximate peripheral shape of a repeated series of longitudinal sections of an outside peripheral portion of a series of parallel elongated pencils, and an integral web between each adjacent pair of the series of longitudinal sections and extending to the second surface. In one embodiment, the second surface further includes a series of spaced parallel longitudinal grooves for reception of pencil cores, formed on the second surface and positioned laterally so as to be aligned to an apex of each repeatable profile. Methods of making the pencil blanks including dies and molds for making the pencil blanks are also disclosed.

1 Claim, 5 Drawing Sheets

DIE FOR MAKING EXTRUDED PENCIL BLANK

This Appln is a Div of Ser. No. 09/023,818 filed Feb. 13, 1998.

FIELD OF THE INVENTION

The present invention relates generally to pencil blanks which subsequently are used to manufacture non-mechanical cored pencils such as pencils having a graphite "pencil lead" core, and more particularly to extruded or molded pencil blanks having a celluosic, e.g. a wood product, and resin content and which are profiled to approximate a peripheral shape of a repeated series of elongated pencils.

BACKGROUND OF THE INVENTION

Non-mechanical pencils are traditionally formed by enclosing a marking core (the "lead", often graphite) in a wooden casing using a multi-step manufacturing process that is somewhat costly. The starting material for making wooden casings has traditionally been natural wood such as incense cedar that is machined to form a flat rectangular pencil "slat". Applicant's assignee has been supplying such slats to pencil manufacturers since about 1880. However, environmental concerns have greatly decreased the availability of incense cedar and other natural woods that traditionally were inexpensively and readily available to pencil manufacturers. Further there has been a demand that wood wastes be recycled and that waste wood from manufacturing operations be minimized. As to the latter, an economic consideration exists with both the slat manufacturers and the pencil manufacturers in avoiding the cost of handling and disposal of undesirable wood waste.

In addition, the starting material for pencil casings must meet standards including flexural or breaking strength, rigidity, sharpenability, low density and bondability to the marking core, etc. Substitute material for the wooden casings and for the involved manufacturing process have long been sought. However, it is difficult to form a casing material that is structurally satisfactory, machineable, paintable and will be acceptable to the user as a substitute for the traditional all-wood casing.

Some attempts have been made to manufacture pencil casings from other than natural wood. It has been proposed as hereafter mentioned to manufacture pencil casings by extrusion and subsequent drying of an aqueous pulp of wood or paper with a suitable binder, or to tightly wrap the marking core with paper and the like. In the case of wet-laid composites, such attempts have been problematic because of the necessity of expelling large mounts of water from the slurry.

Further, the wet-laid composite results in loose cores due to poor adhesion with the casings and gives rise to rough casing surfaces when the slat is machined by pencil-making machines and particularly to poor paintability.

Traditionally, each pencil is formed from first and second slats, which have been machined by the slat manufacturer from large 3"×3"×96" milled cedar or other timbers in lengths of 48" to 192", oft called "pencil stock". The wood timbers may not be uniform or may contain knots. The result is that only about 50% of the pencil stock is useful to produce pencil slats. The pencil stock is sawn into standard slats each having a thickness slightly more than half the thickness of a pencil and, in the case of making a standard 184 mm pencil, slats having nominal dimensions of 4.8 mm thick by 184 mm length by 71.5 mm wide. Each wood slat is then impregnated with wax and a stain under high temperature and pressure to give the pencil to be manufactured a distinctive color and optimum sharpenability. The wood slats are then dried in a kiln, dimensionally inspected and shipped to the pencil manufacturer.

The pencil manufacturer machines a guide line slot into the slat, for use in guiding the slat through a pencil fabricating machine. Each slat is then grooved, glue is applied, a core is laid in the grooves, and top and bottom slats are then pressed together under pressure until the glue sets. This results in a "pencil slat sandwich." The outwardly facing surfaces of the sandwich are then shaped with a shaping machine which, in the last instant of shaping, also cuts the slat into individual pencils of desired shape. Several coats of paint, varnish or lacquer are frequently applied to the individual pencils. Further, foil wrapping or decoration, and a ferrule and eraser may be added to yield a finished pencil.

U.S. Pat. No. 5,516,472 (Strandex) discloses an apparatus and process for combining an organic fibrous material with a thermoplastic material. The material is processed through a low-temperature extruder into a multiple die system, resulting in an extruded composite material forming a wood-imitating composite for decorative moldings, picture frames, furniture, decks, windows, doors and roofs.

U.S. Pat. No. 5,346,930 (Lydall) discloses wood-substitute fiberboard made by a wet-laid process. The fiberboard is formed in large sheets that are then cut into appropriately sized pencil slats. Unfortunately, it is reported that modified traditional pencil machinery must be used because of the increased density of the fiberboard, requiring special diamond-tipped or carbide cutters for shaping the pencils.

U.S. Pat. No. 3,875,088 (Hasbro) discloses pencil casing compositions, a method, and an apparatus for extruding a casing around a hot marking core to make an extrudate which is subsequently cut into the desired pencil lengths. However the co-extruded marking core and casing in Hasbro which produces a graphite marking core with a plastic component is substantially more flexible than a traditional pencil and does not write or sharpen as well as a traditional pencil. Equipment costs are also high.

Wood substitutes such as disclosed by Strandex, Lydall and Hasbro may suffer from high density, lack of uniformity, inappropriate rigidity, poor sharpenability, poor lacquer adhesion, poor core-casing bonding and excessive surface roughness on the finished pencil resultant from machining. Pencils produced from a wet-laid wood substitute are especially prone to these shortcomings.

Difficulties with the traditional pencil making process which is based on machining of natural wood, include environmental concerns such as diminishing supply of the appropriate wood, reducing waste of wood and resulting high costs which are associated with the process. Thus, there is a need for a substitute for natural wood in the manufacture of pencils. Such substitute should be machineable using existing pencil making equipment and should produce a finished pencil whose density, rigidity, strength, cost, sharpenability, and lacquer adhesion rival pencils made with natural wood slats. The present invention provides such a substitute, hereafter called a "pencil blank", and methods and equipment for fabricating pencil blanks.

SUMMARY OF THE INVENTION

Applicant has developed pencil blanks produced by extrusion or molding. The pencil blanks overcome the problems in the traditional pencil making process which relies on the use of pencil "slats" which are produced by the machining of natural wood. The present invention relates to pencil blanks manufactured from wood-resin composite materials. Improved extrusion or molding processes useful for making such pencil blanks and unique dies or molds which are desirable to form the pencil blanks into appropriate shapes for the manufacture of pencils are disclosed. The pencil blanks, processes and dies or molds of the present invention solve existing problems with the traditional pencil making process and the prior art by making use of starting materials which are more available and less expensive than natural wood. Particularly the invention allows the blank manufacturer to provide an article which has been grooved, pre-profiled or both pre-profiled and grooved so as to minimize the previously required rather extensive machining of slats by the pencil manufacturer while allowing the pencil manufacturer to use essentially his standard pencil-making machinery. This is done while at the same time grossly minimizing the formation of wood waste in his pencil manufacturing process and allows a slat manufacturer to utilize his waste products for making the composite material. This results in a minimal waste of wood and avoidance of high waste disposal costs. Thus a pencil "blank" replaces the pencil "slat" traditionally used in the manufacture of pencils. The pencil blank of the present invention can be used to make pencils which have a satisfactory density, uniformity, rigidity as well as sharpenability equivalents to pencils, for example of incense cedar, made by the traditional pencil making process.

Several articles of manufacture are disclosed, namely, a composite material pencil blank pre-profiled on one surface; blanks profiled on opposite surfaces; a blank grooved on one surface; and a sandwich of the blanks containing pre-profiled surfaces on opposite exterior surfaces and encasing pencil cores.

In one embodiment, the invention involves the use of an extrusion process and die with wood-resin composite materials for manufacture of pencil blanks. In another embodiment the invention involves the use of a molding process and mold sections for use with wood-resin composite materials for manufacture of pencil blanks.

The invention involves improvements in the production of slats for the making of discrete pencils. The pencil blanks of the invention are formed and typically pseudo-dimensioned from composite material, including recycled wood products. Pseudo-dimensioned as used herein means a blank which has a slightly thicker profile on one surface and a slightly smaller in cross-section series of grooves on a second surface permitting final machining and shaping or trimming of the profile and grooves slightly to the pencil manufacturer's final desired dimensions. The resultant blanks thus may be handled and finished by traditional pencil making equipment using pencil manufacturing techniques and steps currently employed in a pencil factory.

A generally flat rectangular pencil blank made from a composite celluosic and resin material includes a longitudinal axis, a first surface and a second surface with a repeatable profile transverse to the longitudinal axis on the first surface of the blank, the profile representing an approximate peripheral shape of a repeated series of longitudinal sections of an outside peripheral portion of a series of parallel elongated pencils, and an integral web between each adjacent pair of the series of longitudinal sections and extending to the second surface. In one embodiment, the second surface further includes a series of spaced parallel longitudinal grooves formed on the second surface and positioned laterally so as to be aligned to an apex of each repeatable profile.

DETAILED DESCRIPTION

Figure 1:
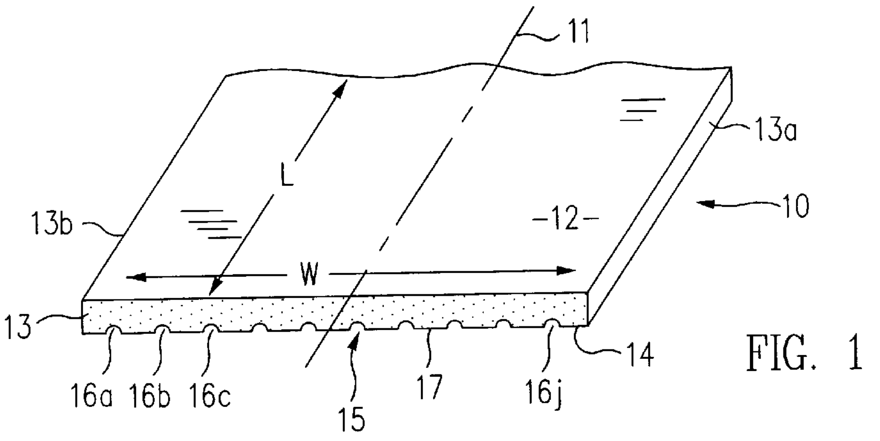
FIG. 1 is a perspective view of a grooved pencil blank of the invention.

In a first embodiment of the invention an extruded pencil blank or a molded pencil blank is formed approximately of the dimensions of the natural wood slats previously supplied by various wood slat supplier's to pencil manufacturers. Preferably the pencil blank is pseudo-dimensioned. Typically for standard 184 mm long pencil production, the pencil blanks will have a longitudinal length of about 184 mm, a transverse width of about 74 mm and for eventual hexagonal pencil production, a thickness of about 4.3 mm. This permits the eventual manufacture of ten pencils with conventional pencil making machining. It is contemplated that wider or less wide blanks may be employed to make more, less, wider or narrower-in-diameter pencils. The pencil blank is made of wood particles and resin composite material and is extruded or molded to form, as seen in FIG. 1 a generally flat rectangular pencil blank 10 having a longitudinal axis 11, a first surface 12 and a second surface 14. A repeatable profile 15 transverse to the longitudinal axis is integrally provided on one surface 14 of this form of a blank, the profile representing a series of spaced parallel longitudinal grooves 16*a*, 16*b*–16*j* is formed on that one surface. The grooves are of a cross-sectional shape to essentially hold a core. An integral web 17 extends between each adjacent pair of grooves, e.g. between groove 16*a* and 16*b* and between 16*b* and 16*c* etc. and extending to the other surface 12. In this embodiment, the surface 12 is not profiled and is a substantially planar surface. Profiling of surface 12 may be done by the pencil manufacturer using his standard equipment. The details of the groove and web are seen in more detail in FIG. 15. Each groove represents one half of the diameter of a core to be placed in the groove.

Figure 2:
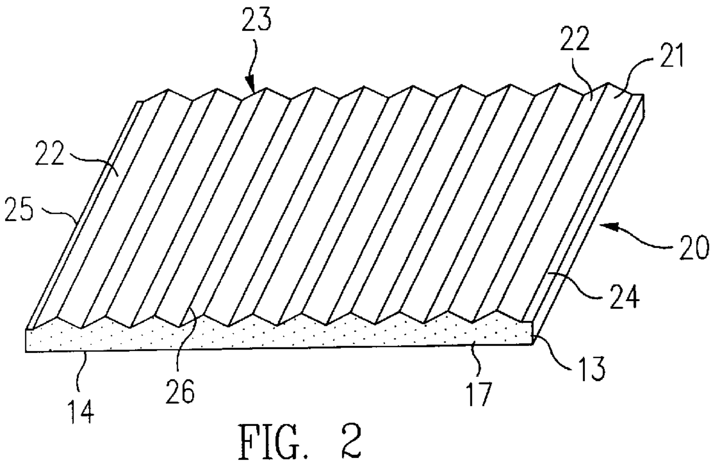
FIG. 2 is a perspective view of a pre-profiled troughed pencil blank of the invention.
Figure 8:
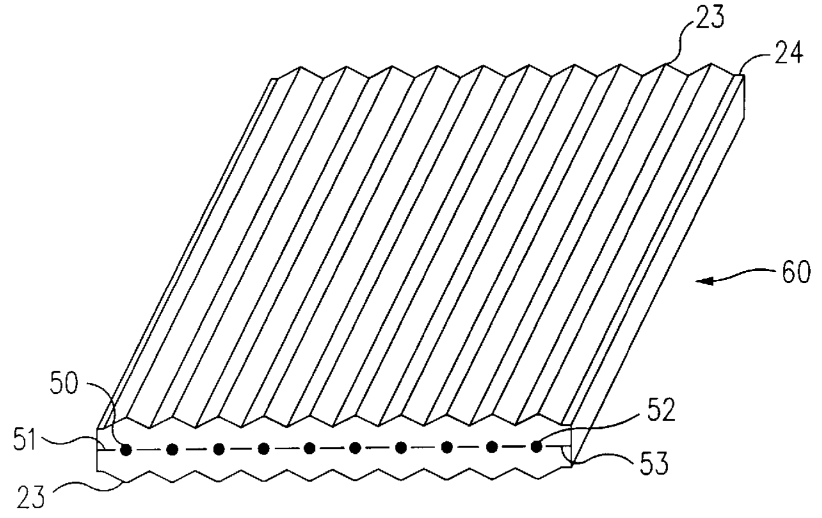
FIG. 8 is a perspective view of a pre-profiled face-to-face assembly of two pencil blanks.

In another embodiment 20 shown in FIG. 2, the first surface 12 (FIG. 1) is pre-profiled, during an extrusion or molding process to form a body 13 having a repeatable profile transverse to the longitudinal axis 11, the profile representing at least an approximate peripheral shape of a repeated series of longitudinal sections 21, 22 of an outside peripheral portion of a series of parallel elongated pencils. The longitudinal sections 21, 22 in FIG. 2 comprise a pair of generally adjacent flat sections to generally form two sides of hexagonal cross-section and are connected by series of apices 23. Eight apices are shown, namely 23*a*–23*j*, extending parallel to one another and representing the makings of ten pencils. Adjacent sections 21 and 22 together form a valley or trough 26 between the adjacent sections. Under each valley 26 is a web 17 (FIG. 15) which with the final shaping of an assembly of blanks (FIG. 8) by the pencil manufacturer, will be cut through to separate individual pencils, with a semi-finished hexagonal section of each of two adjacent pencils remaining thereon. Longitudinal edges 24 and 25 are provided such that the pencil blanks may be accommodated in standard existing pencil manufacturing machinery. In this embodiment, the second surface 14 of the blank is not profiled thus being a planar surface. Grooving of surface would be done by the pencil manufacturer as has been done using wood slats.

Figure 3:
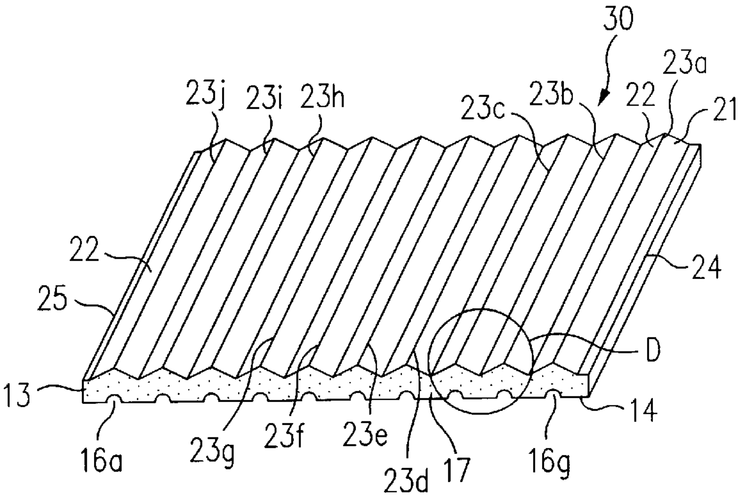
FIG. 3 is a perspective view of a pre-profiled troughed and grooved pencil blank of the invention.

FIG. 3 illustrates a pencil blank 30 wherein the body 13 has been pre-profiled on both surfaces 12 and 14 with the longitudinal sections 21, 22 on surface 12 and the grooved profile 15, namely, grooves 16*a*–16*j*, on surface 14. Each of the spaced parallel longitudinal grooves 16*a*–16*j* are positioned laterally on surface 14 to be aligned with an apex 23 of each of the repeatable profiles on surface 12. Pencil blank 30 thus greatly minimizes the needed final shaping and sizing of the workpiece to be processed by the pencil manufacturer.

Figure 4:
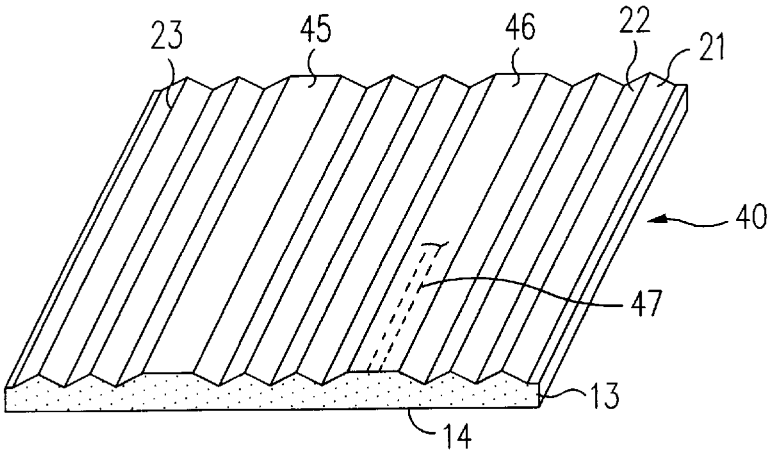
FIG. 4 is a perspective view of a second embodiment of a pre-profiled partially troughed pencil blank.

FIG. 4 illustrates a pencil blank 40 in which one or two of the longitudinal sections 21, 22 are extruded or molded to have an extruded or molded flat longitudinal section(s) 45, 46 which provide a surface to receive a saw guideline cut to guide the pencil blank 40 into the existing grooving and shaping apparatus of the pencil manufacturer. This guideline saw cut per se is illustrated by dashed lines 47 in FIG. 4. The pencil manufacturer in making the final shaping of the blank and the pencil-profiles on surfaces 12 of the assembled blanks (FIG. 8) will machine out the flat(s) 45, 46 so that each is configured as longitudinal sections 21, 22 so that there is no loss of the ten pencils being manufactured from the overall pencil blank. While ten pencil profiles are shown in the illustrated blanks, more or less pencil profiles may be included dependent on the specifications of the pencil manufacturer.

Figure 5:
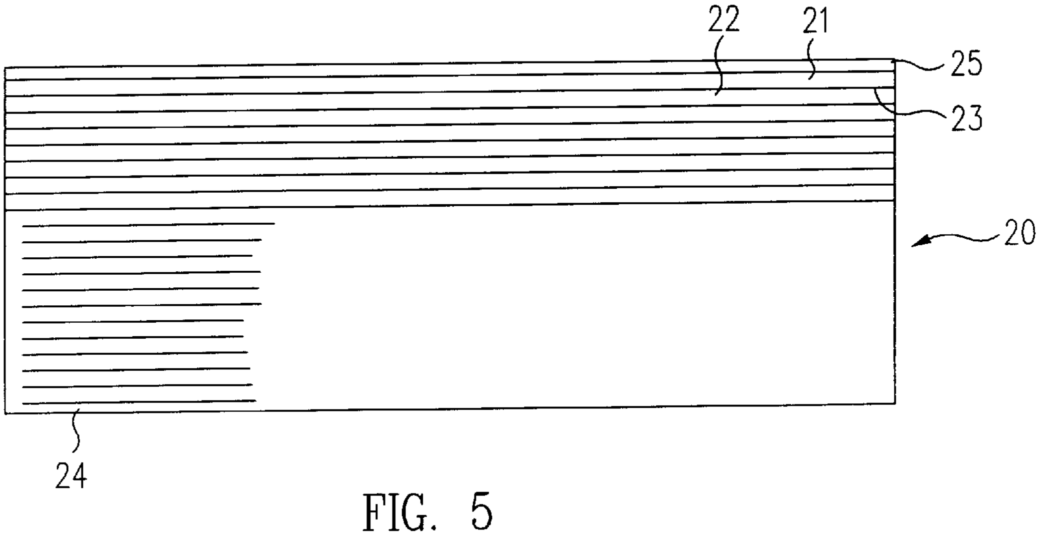
FIG. 5 is a plan view of a pre-profiled blank.
Figure 6:
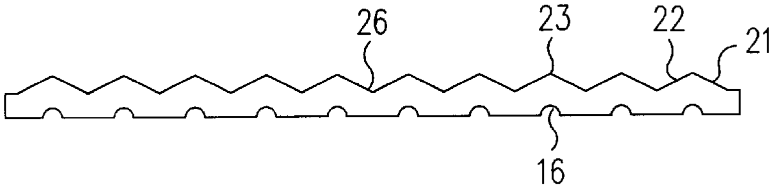
FIG. 6 is an end view of a pre-profiled and pre-grooved blank.

FIGS. 5 and 6 illustrate a plan view of the pencil blank 20 showing longitudinal sections 21, 22 with a apex 23 and a flat V-shaped valley or trough 26 therebetween.

Figure 7:
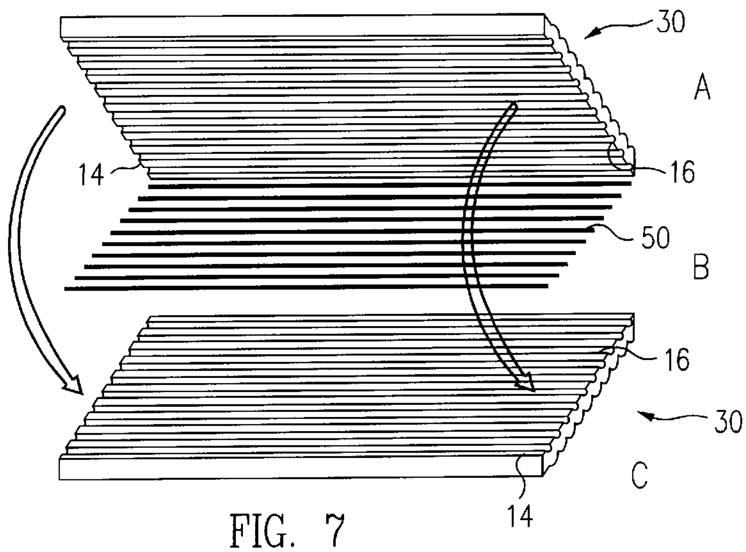
FIG. 7 is a exploded view showing the steps of assembling two pencil blanks.

FIG. 7 illustrates the steps of forming an assembly of two pencil blanks 30, where the grooved surfaces 14 of each pencil blanks are placed in face-to-face relationship. One pencil blank 30 is placed in position C, cores 50 from a location B are laid or otherwise inserted onto an adhesive 51 in the grooves and the other pencil blank 30 is placed from location A upon and aligned with the other pencil blank at C so that the grooves 16 on the other blank encircle a hemispherical surface of the core and is preferably adhesively bonded at 52 and 53 to both the cores and to the interface of two blanks between the cores, respectively. The same adhesive such as polyvinyl acetate (PVA) used with natural wood slats may be employed. The result of this operation is an assembly 60 of two pencil blanks which then can be finish shaped and cut by the pencil manufacturer using standard pencil-making machinery.

Figure 9:
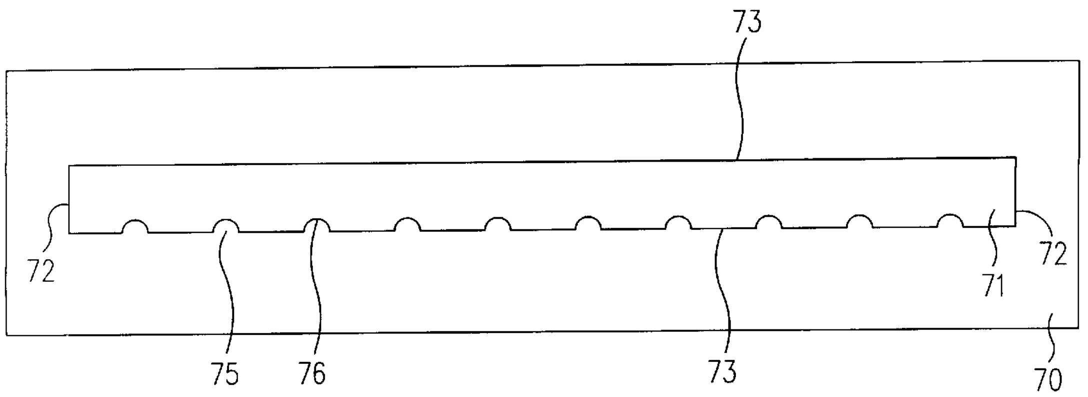
FIG. 9 is a cross-sectional view of a die used to make grooved extruded pencil blanks.

FIG. 9 illustrates an extrusion die 70 which may be employed to extrude the pencil blank 10. The die has an orifice 71 having a flat top 73 representing surface 12, side edges 71, 72 representing the peripheral edges 13*a*, 13*b* of the body 13, and longitudinally extending nubs 75 having a contour 76 representing grooves 16 in body 13.

Figure 10:
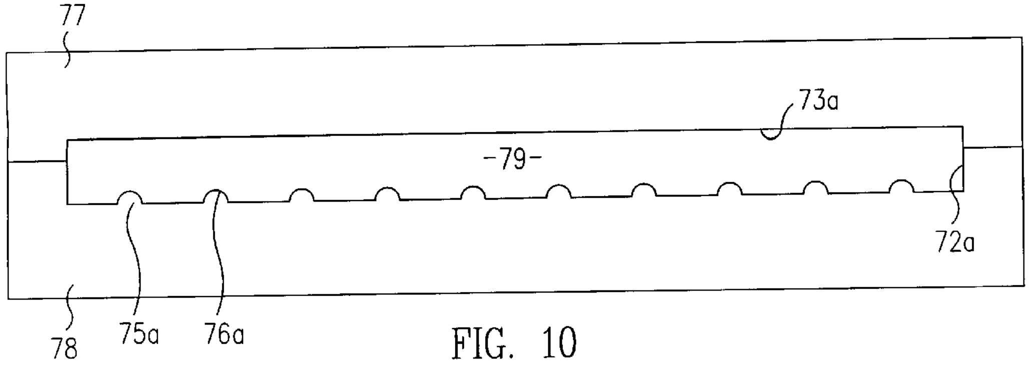
FIG. 10 is a cross-sectional view of a mold used to make a grooved molded pencil blank.

FIG. 10 schematically illustrates typical mold sections or halves 77, 78 which are pressed together and receive molding compound (typically wood flour and resin) in a mold cavity 79. The mold cavity is bounded by edges 72*a*, 73*a* and surfaces 76*a*, the latter corresponding with the grooved surface of blank 10.

Figure 11:
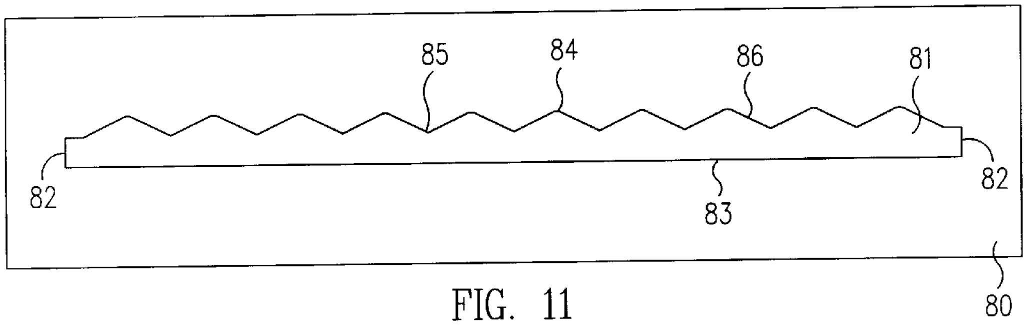
FIG. 11 is a cross-sectional view of a die used to make a troughed extruded pencil blank.
Figure 12:
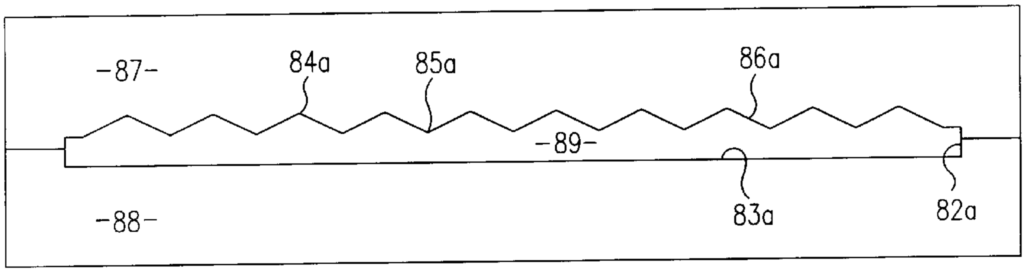
FIG. 12 is a cross-sectional view of a mold used to make a troughed molded pencil blank.

FIG. 11 illustrates a die 80 having an orifice 81, edges 82, a flat planar surface 83 and a profile surface comprising longitudinal sections 86 forming hills 84 and valleys 85 to form part of the hexagonal shape of pencils to be manufactured. Likewise, in FIG. 12 a two-part mold 87, 88 is pressed together to form cavity 89 having the corresponding flat sections 82*a*, 83*a* and profiled sections 84*a*, 85*a* and 86*a* to form the pencil blank 20.

Figure 13:
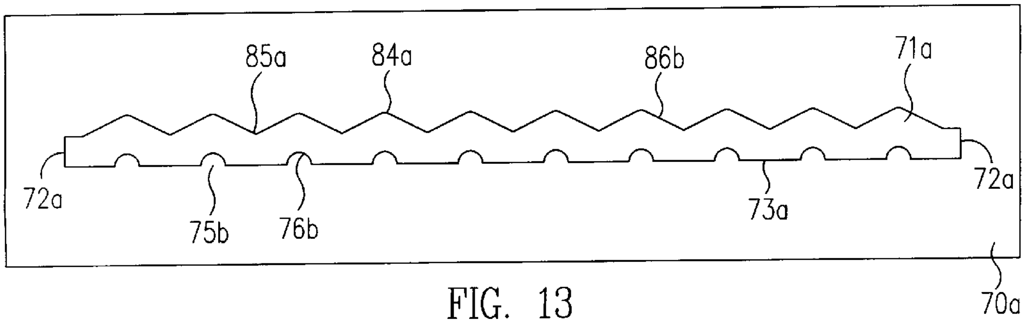
FIG. 13 is a cross-sectional view of a die used to make a troughed and grooved extruded pencil blank.
Figure 14:
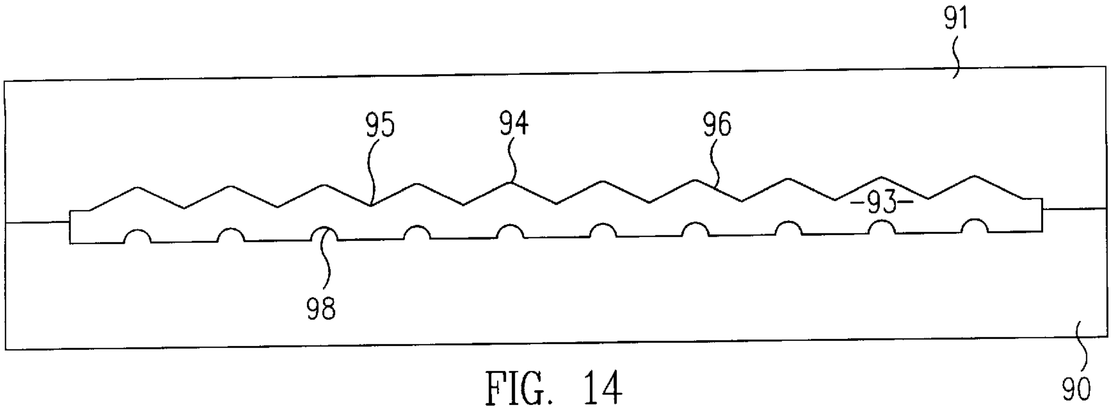
FIG. 14 is a cross-sectional view of a mold used to make a troughed and grooved molded pencil blank.

FIG. 13 shows an extrusion die 70*a* having an orifice 71*a* having edges 72*a*, longitudinal nubs 75*b* on one surface to form a grooved contour 76*b* on surface 14 and surfaces 84*a*, 85*a* and 86*a* to form a portion of a hexagonal profile on surface 12 of the blank 30. FIG. 14 shows mold halves 90, 91 which are pressed together having a cavity 93 with surfaces 92, 94, 95 and 96 to form blank 30. The dies of FIGS. 9, 11 and 13 may be one-out, two-out, three-out or more dies where multiple orifices are provided in one die plate.

Figure 15:
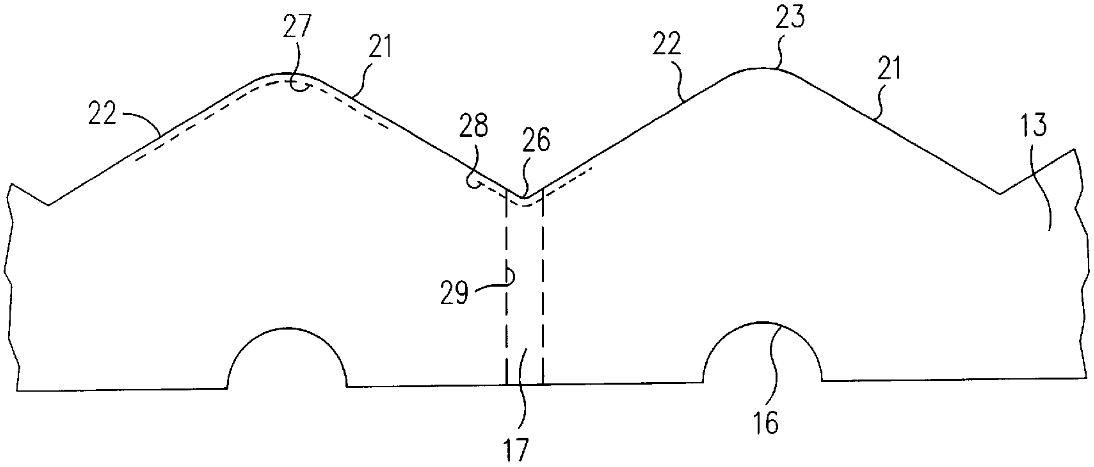
FIG. 15 is a magnified end view of a portion of the pencil blank of FIG. 3.

FIG. 15 shows a magnified view of the circled area D of FIG. 3, particularly illustrating web 17 which is finally cut in the last step of final shaping by the pencil manufacturer, as indicated by dashed lines 29, to both separate each pencil being formed and to form the last two opposite hexagonal portions of each pencil. Further, the final shaping removes any excess or built-in trim of body 13 below surfaces 21, 22, as shown by dashed line 27, to meet the required pencil diameter of a particular pencil manufacturer. While the blanks 10, 20, 30 and 60 may be provided by a pencil blank manufacturer with the exact dimension specified by the pencil manufacturer i.e. essentially no finish machining is needed on surface 21, 22, it is contemplated that the thickness of blanks will be such as to allow a slight "shaving" or trim e.g. to surface 27 or other surface, to meet the pencil specification as to diameter.

In one embodiment of pencil blank 30 for ten pencils, the width will be about 74 mm, the thickness 4.7 mm, the length 184 mm, the trough or valley about 2.6 mm deep, the apex-to-groove distance about 3.7 mm, the radius of the groove with trim 1.0 mm, without trim 0.6 mm, a web width of about 0.3 mm, and a width between troughs of about 7.2 mm. To cover short pencils such as golf score marking pencils or large diameter pencils for cosmetic or artist use the blanks will have differing dimensions. Blanks having a width of from 25 mm to 85 mm, a thickness of from 4.25 mm to 13.25 mm, a length from 110 mm to 310 mm, a trough to bottom dimension from 2.0 mm to 8.5 mm, an apex to groove dimension from 2.8 mm to 12.0 mm, a web width from 0.3 mm to 0.9 mm, and a width between troughs from 2.0 mm to 9.4 mm are contemplated. The radius of the grooves with trim may be from 0.3 mm to 5.0 mm.

Figure 16:
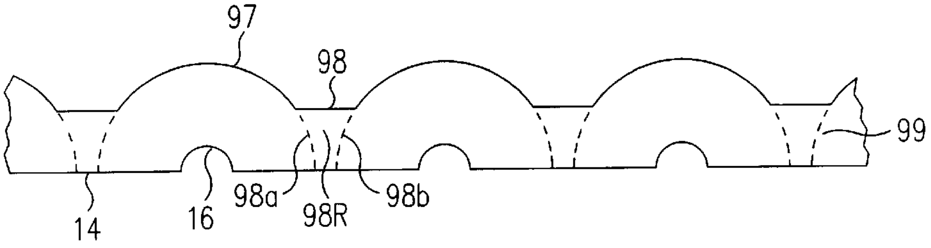
FIG. 16 is a magnified partial end view of a portion of a pencil blank for circular pencils.

FIG. 16 illustrates a pencil blank 99 having grooves 16 on surface 14 and a series of semi-circular bumps 97 extending longitudinally on surface 12. The bumps 97 are aligned with the grooves 16 and have the same center of curvature. The bumps 97 are each separated by a web 98 which is separated along circular arcs 98*a*, 98*b* in the last shaping operation of the pencil manufacturer which removes the volume 98R between the pencil profiles.

All the sizes and shapes described herein are typically used in the pencil making industry. However the invention includes other profiles and sizes used to make a triangular-in-cross-section or a flat-in-cross-section pencil or other shapes made by pencil-making machines.

The extruded pencil blank 10 as well as the blanks 20 and 30 shown in FIGS. 2, 3, and 4, are made from a base mixture including a thermoplastic resin and a celluosic material and may further include a cross-linking agent, a lubricant, a processing aid such as a catalyst or a blowing agent, and a dye. In the molded blanks 10, 20, and 30, the ingredients are primarily celluosic material and a cross-linking agent and do not necessarily need any further resin material or processing aids. For example, a wood floor of 50–95% by weight with a polyurethane cross-linking agent of 50–5% by weight may be employed. These ingredients are useful to obtain a blank material of construction which results in pencils having a satisfactory density, uniformity, rigidity, finishing, paintability and sharpenability equivalent to pencils made of the traditional incense cedar wood and capable of being manufactured by existing conventional pencil manufacturing processes and equipment. The celluosic material may be a softwood flour, a hardwood flour, collectively called wood flour, or other organic materials such as ground newsprint, ground walnut shells, and mixtures thereof. The celluosic material should be present in an amount ranging between approximately 20 to 80%, by weight, of the base mixture. A preferred embodiment is wood flour sized such that 70 to 90% passes through a screen with mesh size of about 40 mesh and present in the amount of 20 to 80% by weight of the base mixture. Another preferred embodiment is incense cedar wood flour, available from waste products from the sawing of cedar, sized such that 70 to 90% passes through a screen with a mesh size of about 40 mesh, and present in the amount of 20 to 80%, by weight, of the base mixture. A more preferred embodiment is incense cedar wood flour sized such that 70 to 99% passes through a screen with a mesh size from about 70 mesh, present in the amount of 20 to 80%, by weight, of the base mixture. A most preferred embodiment is incense cedar wood flour sized such that 85 to 99% passes through a screen with a mesh size from about 70 mesh, present in the amount of 50 to 85%, by weight, of the base mixture.

A thermoplastic resin such as polyethylene, styrene, acrylonitrile-butadiene-styrene resins, polycarbonates, or a combination thereof may be employed. The amount of the thermoplastic resin may range from about 10 to 75%, by weight, of the base mixture. A preferred embodiment is a polyethylene resin, present in the amount of about 10 to 50%, by weight, of the base mixture. A more preferred embodiment is high density polyethylene, present in the amount of 20% to 50%, by weight, of the base mixture. A further preferred embodiment is styrene, present in the amount of about 20% to 50%, by weight, of the base mixture. The cross-linking agent or bonding agent such as a phenolic resin, polyurethane, a melamine resin, a urea-formaldehyde resin or an epoxy resin or a combination thereof may be used. The amount of the cross-linking agent or bonding agent may range from about 0.1% to 50%, by weight, of the base mixture. A preferred embodiment is a combined polyurethane, phenolic resin binder, each present in the amount of about 1 to 40%, by weight, respectively, of the base mixture. A more preferred embodiment is a combination of polyurethane and phenolic resin, comprising polyurethane present in the amount of about 0.5 to 2% and phenolic resin present in the amount of about 3 to 5%, by weight, respectively, of the base mixture. A lubricant may be a metallic soap such as zinc stearate, a wax such as paraffin, talc, stearate, e.g. alkali stearate, fatty acids or a combination thereof may be employed. Lubricants may generally be present from about 2% to 15%, by weight, of the base mixture. In a preferred embodiment the lubricant is a mixture of zinc stearate and paraffin wax, each present in the amount of 1 to 5%, by weight, respectively, of the base mixture. A most preferred embodiment is a mixture of zinc stearate and paraffin wax, present in the amount of 2 to 4% and 1 to 3%, by weight, respectively, of the base mixture. Lubricants act as a aid to sharpenability and function as an extrusion aid.

The processing aid may be an accelerator, an inhibitor, a blowing agent, a pH modifier, an anti-foaming agent, an enhancer, or a compatibilizer or a combination of such may be used. Processing aids are generally present from about 0% to 40% by weight, of the base mixture. In a preferred embodiment the processing aid is a mixture of an accelerator or inhibitor, a blowing agent, a pH modifier, and/or an anti-foaming agent, each present in the amount of about 0 to 5%, by weight, respectively, of the base mixture. Examples of acceptable blowing agents are dicarbonamide, 1.1' asobisformamide, p.p' oxyb (benzene sulfonyl semicarboxide), dinitrosopenta methylene tetramine, bis-benzenosulfonyl hydroxide, asobisisobutyronitrile, or sodium bicarbonate. The blowing agent may be present in the amount of 0 to 40%, by weight, of the base mixture, with a preferred range being about 0 to 15%, by weight, of the base mixture. Blowing agents may be useful in reducing the overall density of the extruded composition.

It is also within the scope of the invention to add other ingredients including coloring agents in the form of dyes or pigments. In a preferred embodiment the coloring agent or dye is present in the amount of 0 to 2% by weight, of the base mixture.

The grooved, profiled, and the profiled and grooved blanks of the present invention minimize waste by the pencil manufacturer. All the types of extruded or molded composite pencil blanks of the invention whether grooved, or profiled or profiled and grooved, utilize what essentially comprises waste wood and further eliminates the approximately 50%–70% waste which is produced in the traditional pencil slat making process. In a most preferred embodiment the pencil blank is troughed profiled and grooved.

The celluosic material in the base mixture for the pencil blank serves as a reinforcing filler and allows for formation of the pencil blank. Celluosic materials which are recycled, biodegradable or by-products from other industries provide a more economical and environmentally desirable product, than virgin wood. The thermoplastic resin serves as a process fluidizer, to enhance the extrudeability of the pencil blank and to contribute to the ease of fabrication to give a sharpenable, substantially rigid pencil. The base mixture may further comprise a sufficient amount of a cross-linking or bonding agent(s) to provide rigidity to the pencil blank by serving to strengthen the bond between the celluosic fibers forming a homogenous product. The base mixture may also contain a lubricant used as a processing aid.

To achieve the aforementioned desired product criteria of sharpenability, adequate structural strength, appropriate density, uniformity and bondability to the marking core coupled with the essential ability to extrude the composition, the celluosic material and thermoplastic resin is present in an appropriate ratio of the celluosic material to thermoplastic resin. In a preferred embodiment the celluosic material and thermoplastic resin is present in a celluosic material/thermoplastic resin ratio of from about 5:1 to 1:3 of the base mixture. A more preferred embodiment is a celluosic material/thermoplastic resin ratio of from about 4:1 to 1:0 of the base mixture. A most preferred embodiment for an extruded blank is a celluosic material/thermoplastic resin ratio of from about 3:1 to 1:1 of the base mixture. In a preferred embodiment the wood-resin composite material has a specific gravity from about 0.5 to 1.5. In a more preferred embodiment the wood-resin composite material has a specific gravity from about 0.5 to 1.3. In a most preferred embodiment the wood-resin composite material has a specific gravity from about 0.5 to 0.8. While a thermoplastic resin is discussed above a thermosetting resin may be employed.

The invention provides a method for the production of a molded pencil blank. In one embodiment from about 50 to 95% wood flour is mixed with from about 5 to 50% thermosetting resin. An isocyanate and polyol forming a polyurethane may be used. The base mixture is then transferred into one of a series of molds that take the form of multiple grooved blanks, multiple profiled blanks or a profiled and grooved blanks as depicted as one mold in FIGS. 10, 12, and 14. The molds are then placed in a high pressure hydraulic press. Pressure is applied by the press simultaneous to the mold halves while the mold halves are heated at a temperature for about 2 to 20 minutes in order for the mixture to reach a specific gravity of 0.5 to 1.5. Following the heating and pressure treatment, which causes the isocyanate to react and bind the mixture, the mold is released and the formed blank(s) emptied from the mold. Before or after emptying the blanks are cooled for about 5 to 30 minutes, trimmed of excess flash material from the edges of the mold and cut into specified lengths and/or widths. Details of suitable molding techniques and apparatus are seen in the Plastics Engineering Handbook of the SPS, Fifth Edition 1991, published by Chapman & Hall.

The invention provides a process for the production of an extruded pencil blank, comprising the steps of combining a celluosic material, dried to a moisture content of from about 1 to 9%, with a sufficient amount of thermoplastic resin such as polyethylene, and optionally a lubricant and a cross-linking or bonding agent, as discussed above, to form a base mixture. The base mixture is extruded at a temperature from about 100° F. to about 500° F., wherein the flow rate of the extrudate is between approximately 100 and 5000 pounds per hour such that the base mixture is blended together into a substantially homogenous mixture. This mixture is passed through an extrusion die to shape the mixture into the desired blank configuration. Details of suitable extrusion techniques and apparatus are seen in the above referenced Handbook. Also reference is made to the U.S. Pat. No. 3,875,088 as to the extrusion of a wood celluosic material and resin.

A saw, such as a flying cut-off saw, may be used to cut the blanks into working length blanks which may be subsequently cut by an equalizing saw into pre-established lengths and are shipped to a pencil manufacturer. Blanks, such as those in FIGS. 1–4 may be shipped to the pencil manufacturer, in the form of: a grooved pencil blank 10 (FIG. 1); a partial hexagonally profiled pencil blank 20 (FIG. 2), or a profiled and grooved pencil blank 30 (FIG. 3), with (FIG. 4) or without a flat horizontal surface 45, 46 at a position over one or more generally V-shaped troughs formed by surfaces 21, 22 and best seen in FIG. 15 or with a profile seen in FIG. 16.

In all embodiments, the final dimensions for the grooves for core laying and the opposite side profile to achieve a finished pencil shape may be machined by the pencil manufacturer to meet appropriate specifications for a given size of core and final cross-sectional dimension of the pencils being manufactured. The exterior configuration of the a profile surface on the blank may be called a "pseudo" hexagonal (or round) surface since it may not represent the final configuration of a finished commercial pencil. Press machinery is used by the pencil manufacturer to produce sandwiches comprising two grooved blanks with cores laid in the grooves of one of the blanks. An adhesive binder is placed on the facing grooved surfaces of the blanks including adhesive in the grooves and the webs between the grooves which blanks then are adhered together. Sandwiches of the pencil blanks are then passed through a shaper comprising cutters which define the outer shape of the pencil based on appropriate specifications for a given use. Little waste material need be produced in the case of pre-profiled blanks since only from about 0.1 mm to 1.0 mm need be machined off the profiled and grooved blank to obtain the desired final pencil dimensions and shape, thus minimizing the production of waste by the pencil manufacturer.

EXAMPLE I

Pine tree celluosic material ground to a particle size was dried to a moisture content of about 1 to 3% and combined with the thermoplastic resin (polyethylene), a lubricant namely a combination of zinc stearate and paraffin wax and a cross-linking or bonding agent, namely phenolic resin and polyurethane, in combination, to form a base mixture. The base mixture was mixed and extruded at a temperature of approximately 350° F. with a flow rate of approximately 120 pounds per hour. The homogenous mixture was passed through a die having the shape of the desired cross-section of the blank to be formed. The resulting extruded cellulose-polymer composite material was sprayed with cool water and cut into working length blanks. The blanks had a grooved surface and an opposite pre-profiled troughed surface forming a pencil half-emulating surface. The blanks were passed through a grooving machine to remove the trim. Glue was applied to one or both of the blanks, a core was laid into each groove, the top and bottom blanks pressed together and held in place for more than 24 hours under pressure. The resulting "pencil blank sandwich" was shaped and finished by a conventional pencil shaping machine from the pseudo-profile form to the finished pencil form. The finish machining separated the individual pencils from the blank with a minimum of waste material, namely about 60–70% less waste than conventional pencil making from natural cedar slats. The composition of the base mixture was as follows:

| Component | % by weight | |
|---|---|---|
| wood flour (pine) | 66 | (mesh size = 40) |
| high density polyethylene | 26 | |
| zinc stearate | 2 | |
| paraffin wax | 1 | |
| polyurethane | 1 | |
| phenolic resin | 4 | |

EXAMPLE II

Pencil blanks were prepared as set forth in Example I, with the exception that an incense cedar wood flour of 70 mesh was utilized. The composition of the base mixture was as follows:

| Component | % by weight | |
|---|---|---|
| wood flour (incense cedar) | 66 | (mesh size = 70) |
| high density polyethylene | 26 | |
| zinc stearate | 2 | |
| paraffin wax | 1 | |
| polyurethane | 1 | |
| phenolic resin | 4 | |

EXAMPLE III

Pencil blanks were prepared as set forth in Example I, with the exception of the wood flour which was changed to 70 mesh oak and the amount of polyethylene was reduced. The composition of the base mixture was as follows:

| Component | % by weight | |
|---|---|---|
| wood flour (oak) | 69.5 | (mesh size = 70) |
| high density polyethylene | 22 | |
| zinc stearate | 2.5 | |
| paraffin wax | 1 | |
| polyurethane | 1 | |
| phenolic resin | 4 | |

EXAMPLE IV

Pencil blanks may be prepared as set forth in Example I, with the exception that the incense cedar wood flour is changed to 70 mesh and polystyrene is substituted for polyethylene. The composition of the base mixture is as follows:

| Component | % by weight | |
|---|---|---|
| wood flour (incense cedar) | 66 | (mesh size = 70) |
| polystyrene | 26 | |
| zinc stearate | 2 | |
| paraffin wax | 1 | |
| polyurethane | 1 | |
| phenolic resin | 4 | |

The foregoing description details specific methods and compositions which can be employed to practice the present invention. Having detailed such specific methods and compositions those skilled in the art will well enough know how to devise alternative reliable methods and compositions using the present invention. Thus, however detailed the foregoing may appear in text, it should not be construed as limiting the overall scope thereof; rather, the ambit of the present invention is to be determined only by the lawful construction of the appended claims. Accordingly, all suitable modifications and equivalents fall within the scope of the invention. All publications and patent applications mentioned in this specification are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims.

What is claimed is:

1. A die including a die orifice for making an extruded pencil blank, said orifice comprising an essentially rectangular configuration having a series of longitudinally extending semi-circular in cross-section nubs on a first die orifice surface to form a grooved first surface on an extrudate, and a series of longitudinally extending V-shaped troughs on an opposite second die orifice surface to form a troughed profile on a second surface of the extrudate, wherein each V-shaped trough forms a portion of a hexagonal profile, and wherein apices of the troughs are aligned with the nubs.

* * * * *

UNITED STATES PATENT AND TRADEMARK OFFICE

CERTIFICATE OF CORRECTION

PATENT NO. : 6,171,096 B1
DATED : January 9, 2001
INVENTOR(S) : Laurence R. Hood It is certified that error appears in the above-identified patent and that said Letters Patent is hereby corrected as shown below:

Column 1,
Line 41, "machineable" should read -- machinable -- .

Column 8,
Line 36, asobisformamide" should read -- azobisformamide -- .
Line 38, asobisisobutyronitrile" should read -- azobisisobutyronitrile --

Signed and Sealed this

Twenty-eighth Day of August, 2001

*Attest:*

NICHOLAS P. GODICI

*Attesting Officer*

*Acting Director of the United States Patent and Trademark Office*